United States Patent
Shang et al.

(10) Patent No.: US 7,389,577 B1
(45) Date of Patent: Jun. 24, 2008

(54) METHOD TO FABRICATE AN ESD RESISTANT TUNNELING MAGNETORESISTIVE READ TRANSDUCER

(75) Inventors: Changhe Shang, Fremont, CA (US); Yun-Fei Li, Fremont, CA (US); Yining Hu, Fremont, CA (US); Yong Shen, Saratoga, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 11/768,883

(22) Filed: Jun. 26, 2007

(51) Int. Cl.
*G11B 5/127* (2006.01)
*H04R 31/00* (2006.01)

(52) U.S. Cl. .............. 29/603.14; 29/603.11; 29/603.13; 360/324.1; 360/324.11; 360/324.12; 360/324.2; 427/127; 427/128

(58) Field of Classification Search .............. 29/603.11, 29/603.13–603.16, 603.18; 360/323, 324, 360/324.1, 324.11, 324.12, 324.2; 427/127, 427/128
See application file for complete search history.

(56) References Cited

U.S. PATENT DOCUMENTS

| | | | |
|---|---|---|---|
| 4,001,684 | A | 1/1977 | Fritts |
| 5,539,598 | A | 7/1996 | Denison et al. |
| 6,275,361 | B1 | 8/2001 | Wallash et al. |
| 6,400,534 | B1 | 6/2002 | Klaassen |
| 6,424,505 | B1 | 7/2002 | Lam et al. |
| 6,650,511 | B2 | 11/2003 | Hsiao et al. |
| 6,678,127 | B2 | 1/2004 | Hsiao et al. |
| 6,710,983 | B2 | 3/2004 | Voldman |
| 6,846,991 | B2 | 1/2005 | Girard et al. |
| 6,914,758 | B2 | 7/2005 | Ryan et al. |
| 6,944,937 | B2 | 9/2005 | Hsiao et al. |
| 6,972,930 | B1 | 12/2005 | Tang et al. |
| 7,009,820 | B1 | 3/2006 | Hogg |
| 7,046,488 | B1 | 5/2006 | Hogg |
| 7,054,085 | B2 | 5/2006 | Lin et al. |
| 7,119,995 | B2 | 10/2006 | Granstrom et al. |
| 7,151,654 | B1 * | 12/2006 | Mao et al. ................ 360/324.2 |
| 2005/0141143 | A1 | 6/2005 | Ono et al. |
| 2006/0146450 | A1 | 7/2006 | Beach et al. |
| 2006/0198057 | A1 | 9/2006 | Leung et al. |

OTHER PUBLICATIONS

Shang, et al., "Kinetics of pinhole nucleation and growth in magnetic tunnel junctions", Journal of Applied Physics, vol. 93, No. 10, May 15, 2003, pp. 7017-7019.

* cited by examiner

*Primary Examiner*—Paul D Kim
(74) *Attorney, Agent, or Firm*—Jonathan E. Prejean, Esq.

(57) ABSTRACT

A method to fabricate a tunneling magnetoresistive (TMR) read transducer is disclosed. An insulative layer is deposited on a wafer substrate, and a bottom lead is deposited over the insulative layer. A laminated TMR layer, having a plurality of laminates, is deposited over the bottom lead. A TMR sensor having a stripe height is defined in the TMR layer, and a parallel resistor and first and second shunt resistors are also defined in the TMR layer. A top lead is deposited over the TMR sensor. The parallel resistor is electrically connected to the bottom lead and to the top lead. The first shunt resistor is electrically connected to the bottom lead and the wafer substrate, and the second shunt resistor is electrically connected to the top lead and the wafer substrate.

15 Claims, 5 Drawing Sheets

US 7,389,577 B1

METHOD TO FABRICATE AN ESD RESISTANT TUNNELING MAGNETORESISTIVE READ TRANSDUCER

FIELD OF THE INVENTION

The present invention relates generally to information storage devices, and in particular to methods for protecting magnetic recording heads from electrostatic discharge.

BACKGROUND

The typical hard disk drive includes a head disk assembly (HDA) and a printed circuit board (PCB) attached to a disk drive base of the HDA. The head disk assembly includes at least one disk, a spindle motor for rotating the disk, and a head stack assembly (HSA). The printed circuit board assembly includes electronics and firmware for controlling the rotation of the spindle motor and for controlling the position of the HSA, and for providing a data transfer channel between the disk drive and its host.

The spindle motor typically includes a rotor including one or more rotor magnets and a rotating hub on which disks mounted and clamped, and a stator. If more than one disk is mounted on the hub, the disks are typically separated by spacer rings that are mounted on the hub between the disks. Various coils of the stator are selectively energized to form an electromagnetic field that pulls/pushes on the rotor magnet(s), thereby rotating the hub. Rotation of the spindle motor hub results in rotation of the mounted disks.

The head stack assembly typically includes an actuator, at least one head gimbal assembly (HGA), and a flex cable assembly. During operation of the disk drive, the actuator must rotate to position the HGAs adjacent desired information tracks on the disk. The actuator includes a pivot-bearing cartridge to facilitate such rotational positioning. The pivot-bearing cartridge fits into a bore in the body of the actuator. One or more actuator arms extend from the actuator body. An actuator coil is supported by the actuator body, and is disposed opposite the actuator arms. The actuator coil is configured to interact with one or more fixed magnets in the HDA, typically a pair, to form a voice coil motor. The printed circuit board assembly provides and controls an electrical current that passes through the actuator coil and results in a torque being applied to the actuator.

Each HGA includes a head for reading and writing data from and to the disk. In magnetic recording applications, the head typically includes an air bearing slider and a magnetic transducer that comprises a writer and a read element. For example, FIG. 1 depicts a distal portion of a typical HGA 100 that includes magnetic recording head 102. Head 102 comprises air bearing slider 104 and magnetic transducer 106. The magnetic transducer's writer may be of a longitudinal or perpendicular design, and the read element of the magnetic transducer is typically magnetoresistive (MR). The head 102 is adhered to a gimbal 112 of a suspension assembly 110. Suspension assembly 110 also includes a load beam 114, a bend region (not shown), and a swage plate (not shown). The suspension assembly 110 acts to preload the air bearing slider against the surface of the disk. Electrical communication with the magnetic transducer is accomplished via gimbal traces 116, which are electrically connected to bond pads on the head by solder balls 120.

MR read elements of all types are easily damaged by electrostatic discharge (ESD), and tunneling MR read sensors (a.k.a. "TMR" read sensors) in particular are very easily damaged by ESD even at comparatively lower voltages. Prior art methods for protecting MR read sensors from damage due to ESD have had limited success for various reasons. For example, some prior art methods have undesirably and/or excessively complicated wafer-processing steps during manufacture of the magnetic recording heads. Other prior art methods offer insufficient ESD protection and/or do not afford protection early enough in the manufacturing process. For example, TMR read sensors are particularly vulnerable to ESD damage during the manufacturing process before the bond pads of the head are electrically connected to HGA gimbal traces (which may themselves connect to some protective circuitry). Thus, there is a need in the art for an improved method to fabricate a read transducer including a TMR read sensor.

SUMMARY

A method to fabricate a tunneling magnetoresistive (TMR) read transducer is disclosed and claimed. An insulative layer is deposited on a wafer substrate, and a bottom lead is deposited over the insulative layer. A laminated TMR layer, having a plurality of laminates, is deposited over the bottom lead. A TMR sensor having a stripe height is defined in the TMR layer, and a parallel resistor and first and second shunt resistors are also defined in the TMR layer. A top lead is deposited over the TMR sensor. The parallel resistor is electrically connected to the bottom lead and to the top lead. The first shunt resistor is electrically connected to the bottom lead and the wafer substrate, and the second shunt resistor is electrically connected to the top lead and the wafer substrate.

DESCRIPTION OF THE PREFERRED EMBODIMENTS

MR read sensors can comprise various laminate structures, each presenting unique fabrication challenges and promising unique potential performance characteristics and sensitivity. Tunneling MR read sensors (a.k.a. "TMR" read sensors) are one of the most sensitive types of MR read sensors and so are useful to detect very weak magnetic fields. TMR read sensors are laminated structures, and they include various laminates including a thin "barrier" laminate that comprises a material that would be insulative in bulk.

The integrity of the barrier laminate can strongly affect the performance of the TMR read sensor, but such integrity can be compromised by electrostatic discharge (ESD). For example, minor ESD events can cause pin-hole defects in the barrier laminate that can degrade the performance of a TMR read sensor, and major ESD events can catastrophically damage the barrier laminate, effectively destroying the TMR read sensor.

Figure 1:
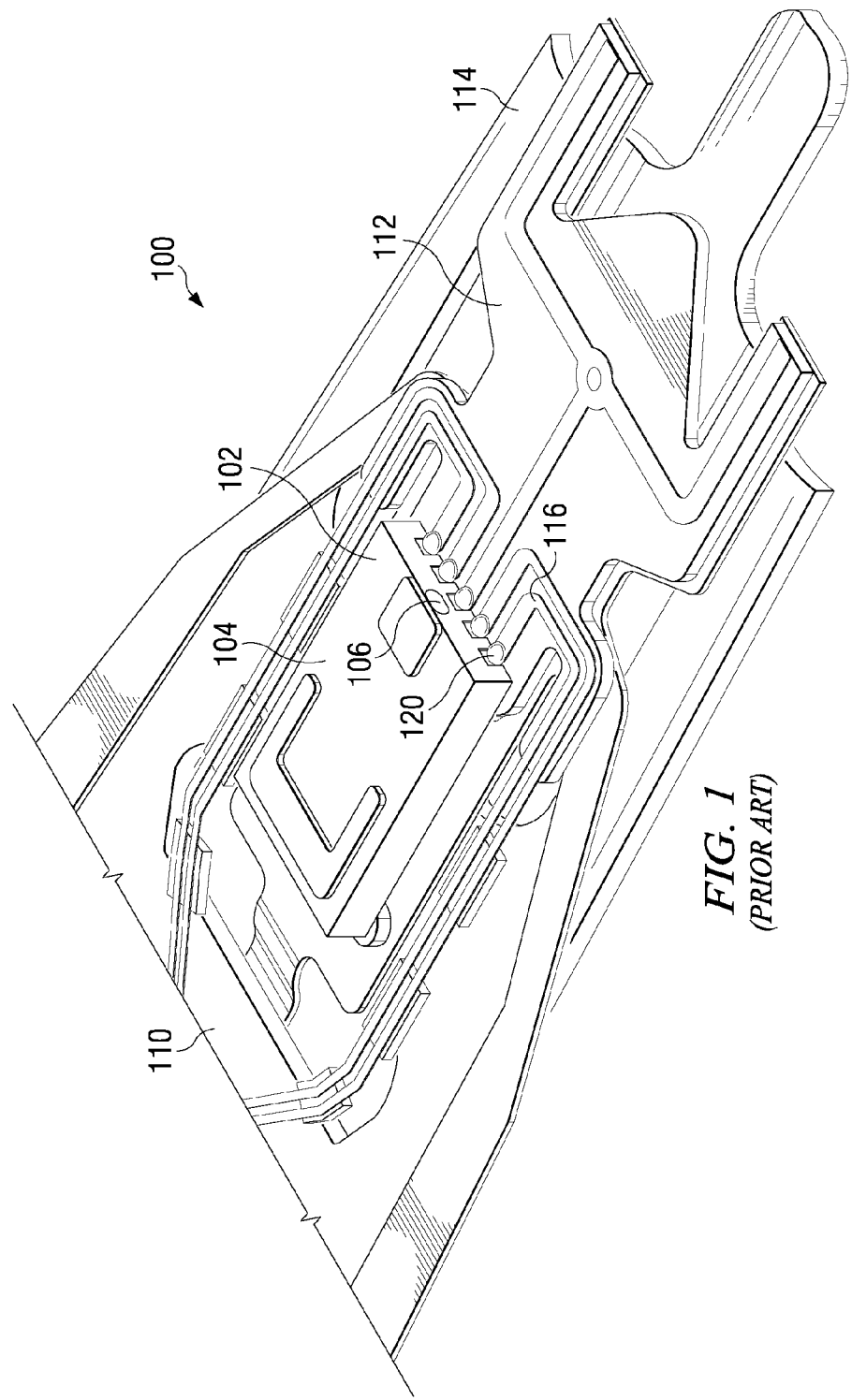
FIG. 1 depicts a distal portion of a contemporary head gimbal assembly.
Figure 2:
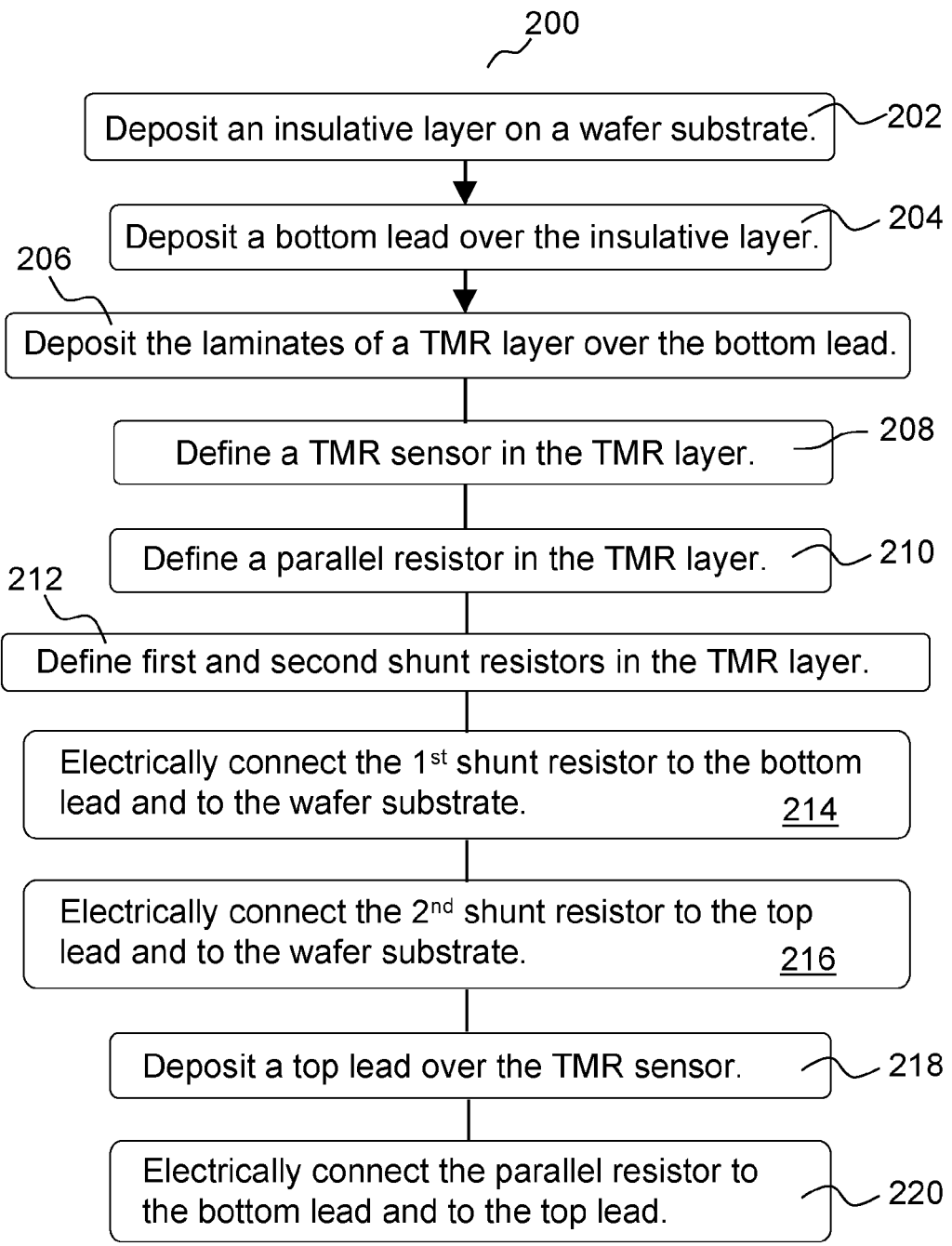
FIG. 2 depicts a method to fabricate a tunneling magnetoresistive read transducer according to an embodiment of the present invention.

FIG. 2 depicts a method 200 to fabricate a tunneling magnetoresistive (TMR) read transducer according to an embodiment of the present invention. In step 202, an insulative layer is deposited on a wafer substrate. The insulative layer may comprise an oxide of aluminum (e.g. alumina), an oxide of silicon, or another insulative material such as an oxide of another metal. In step 204, a bottom lead is deposited over the insulative layer. The term "over" as used herein is intended to include, for example, situations of partial overlap and situations of complete overlap. Furthermore, consistent with this disclosure an overlapping layer can be understood to be "over" and underlying layer where the overlapping layer is deposited directly on the underlying layer, or where one or more intermediate layers lie between the overlapping layer and the underlying layer. The bottom lead may comprise a conductive metal such as tantalum, gold, aluminum, nickel, cobalt, iron or copper, or an alloy or laminate thereof, for example.

Still referring to the embodiment of FIG. 2, in step 206 a laminated TMR layer is deposited over the bottom lead. The laminated TMR layer may be a so-called full-film layer, which covers significantly more area than the intended area of a TMR sensor to be later defined by etching, for example. The laminated TMR layer comprises a plurality of laminates. For example, the plurality of laminates may include one or more seed laminates. Such a seed laminate may include one or more metals such as tantalum, chromium, nickel, iron, and/or ruthenium. In certain embodiments such a seed laminate may be 10 Å to 60 Å thick. The plurality of laminates may also include an anti-ferromagnetic laminate. Such an anti-ferromagnetic laminate may include platinum manganese or iridium manganese, for example. In certain embodiments such an anti-ferromagnetic laminate may be 50 Å to 140 Å thick. The plurality of laminates may also include one or more ferromagnetic pinned laminates, perhaps comprising nickel, iron and/or cobalt, for example. In certain embodiments such a ferromagnetic pinned laminate may be 15 Å to 30 Å thick. The plurality of laminates includes at least one barrier laminate comprising a material that would be insulative in bulk, such as an oxide of aluminum, titanium, or magnesium, and/or a nitride of aluminum, silicon, or niobium, for example. In certain embodiments such a barrier laminate may be 5 Å to 12 Å thick. The plurality of laminates may also include one or more ferromagnetic free laminates, perhaps comprising nickel, iron and/or cobalt, for example. In certain embodiments such a ferromagnetic free laminate may be 15 Å to 80 Å thick. The plurality of laminates may also include one or more capping laminates, perhaps comprising tantalum or ruthenium, for example. In certain embodiments such a capping laminate may be 20 Å to 300 Å thick. The laminated TMR film preferably has a resistance area product no greater than $10\,\Omega{*}\mu m^2$.

Still referring to the embodiment of FIG. 2, in step 208 a TMR sensor is defined in the TMR layer. The TMR sensor may be characterized by a stripe height that is defined by etching, for example. Such etching may be accomplished using a vacuum manufacturing apparatus, such as a commercially available apparatus for directing ions at a wafer target that is enclosed in an evacuated chamber. In step 210 a parallel resistor is defined in the TMR layer. In a preferred embodiment, step 210 is accomplished using the same vacuum manufacturing apparatus and by the same etching technique used in step 208. In a preferred embodiment, step 210 is performed simultaneously with step 208 in a single process step. In step 212, first and second shunt resistors are defined in the TMR layer. In a preferred embodiment, step 212 is accomplished using the same vacuum manufacturing apparatus and by the same etching technique used in steps 208 and 210. In a preferred embodiment, step 212 is performed simultaneously with steps 208 and 210 in a single process step.

Still referring to the embodiment of FIG. 2, in step 218 a top lead is deposited over the TMR sensor. The top lead preferably, but not necessarily includes one or more of the same metals used in the bottom lead deposited in step 204. The top lead may be deposited before or after one or more of the defining steps 210 and 212, but is preferably deposited after all of the defining steps 208, 210, and 212.

Still referring to the embodiment of FIG. 2, in step 214 the first shunt resistor is electrically connected to the bottom lead and the wafer substrate, and in step 216 the second shunt resistor is electrically connected to the top lead and the wafer substrate. Steps 214 and 216 may be partially accomplished by patterning the insulative layer that was deposited on the wafer substrate in step 202, prior to the deposition of the TMR layer in step 206. Steps 214 and 216 may also be partially or wholly accomplished by deposition and patterning of a conductive layer (e.g. metallic layer) such as the layer from which the top lead is defined. For example, the performance of step 218 preferably but not necessarily also serves to partially perform step 216 (e.g. in embodiments where the top lead is deposited to be in contact with the second shunt resistor).

Still referring to the embodiment of FIG. 2, in step 220 the parallel resistor is electrically connected to the bottom lead and to the top lead. Step 220 may be partially accomplished by deposition of the laminated TMR layer over the bottom lead in step 206. Step 220 may also be partially by deposition and patterning of a conductive layer (e.g. metallic layer) such as the layer from which the top lead is defined. For example, the performance of step 218 preferably but not necessarily also serves to partially perform step 220 (e.g. in embodiments where the top lead is deposited to be in contact with the parallel resistor).

Magnetoresistive (MR) read elements change electrical resistance in response to an applied magnetic field. The change in electrical resistance, $\Delta R$, can be expressed in relation to the total resistance R, as $\Delta R/R$. To measure $\Delta R$ and R, a current can be passed through the MR read element, while the voltage across it is measured. The current enters and exits the MR read element via leads that are deposited on or adjacent to the MR read element. For example, the leads may be deposited at opposing ends of the MR element, and the current passed through in the plane of the MR element. With such a lead configuration, an MR element operates as a "current in the plane" (i.e. CIP) MR element. Alternatively, the leads may be deposited on opposing sides of the MR element, and the current passed through the MR element in a direction perpendicular to its plane. With such a lead configuration, an MR element operates as a "current perpendicular to the plane" (i.e. CPP) MR element.

Figure 3A:
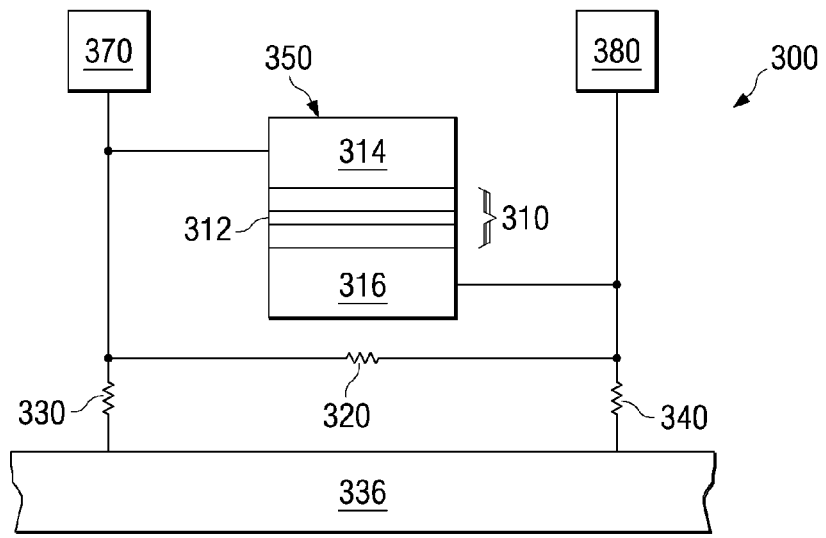
FIG. 3A is a schematic drawing of a tunneling magnetoresistive read transducer according to an embodiment of the present invention.

FIG. 3A is a schematic drawing of a tunneling magnetoresistive read transducer 300 according to an embodiment of the present invention. Laminated TMR layer 310 includes barrier laminate 312. The laminate thicknesses are not shown to scale in FIG. 3A, allowing the apparent relative thickness of the barrier laminate to be exaggerated for enhanced clarity in its labeling. Top lead 314 overlies, and bottom lead 316 underlies, the portion of laminated TMR layer 310 from which TMR sensor 350 is defined. Top lead 314 is electrically connected to bond pad 370 and parallel resistor 320. Bottom lead 316 is electrically connected to bond pad 380 and parallel resistor 320. Shunt resistor 330 is electrically connected to top lead 314 and substrate 336. Shunt resistor 340 is electrically connected to bottom lead 316 and substrate 336.

Figure 3B:
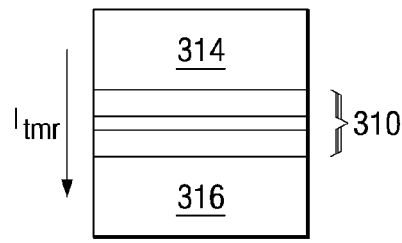
FIG. 3B is a schematic drawing depicting current flow perpendicular to the plane of a laminated TMR layer.
Figure 3C:
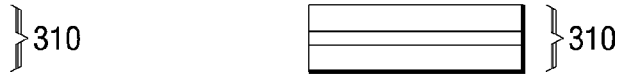
FIG. 3C is a schematic drawing depicting current flow parallel to the plane of a laminated TMR layer.

In the embodiment of FIG. 3A, parallel resistor 320, and shunt resistors 330 and 340, utilize portions (not shown) of laminated TMR layer 310, but in a different way than does TMR sensor 350. Specifically, whereas in TMR sensor 350 the electrical current $I_{tmr}$ flows perpendicular to the plane of the laminated TMR layer 310 (as shown in FIG. 3B), in the parallel and shunt resistors the electrical current $I_{esd}$ flows parallel to the plane of the laminated TMR layer 310 (as shown in FIG. 3C).

Figure 4:
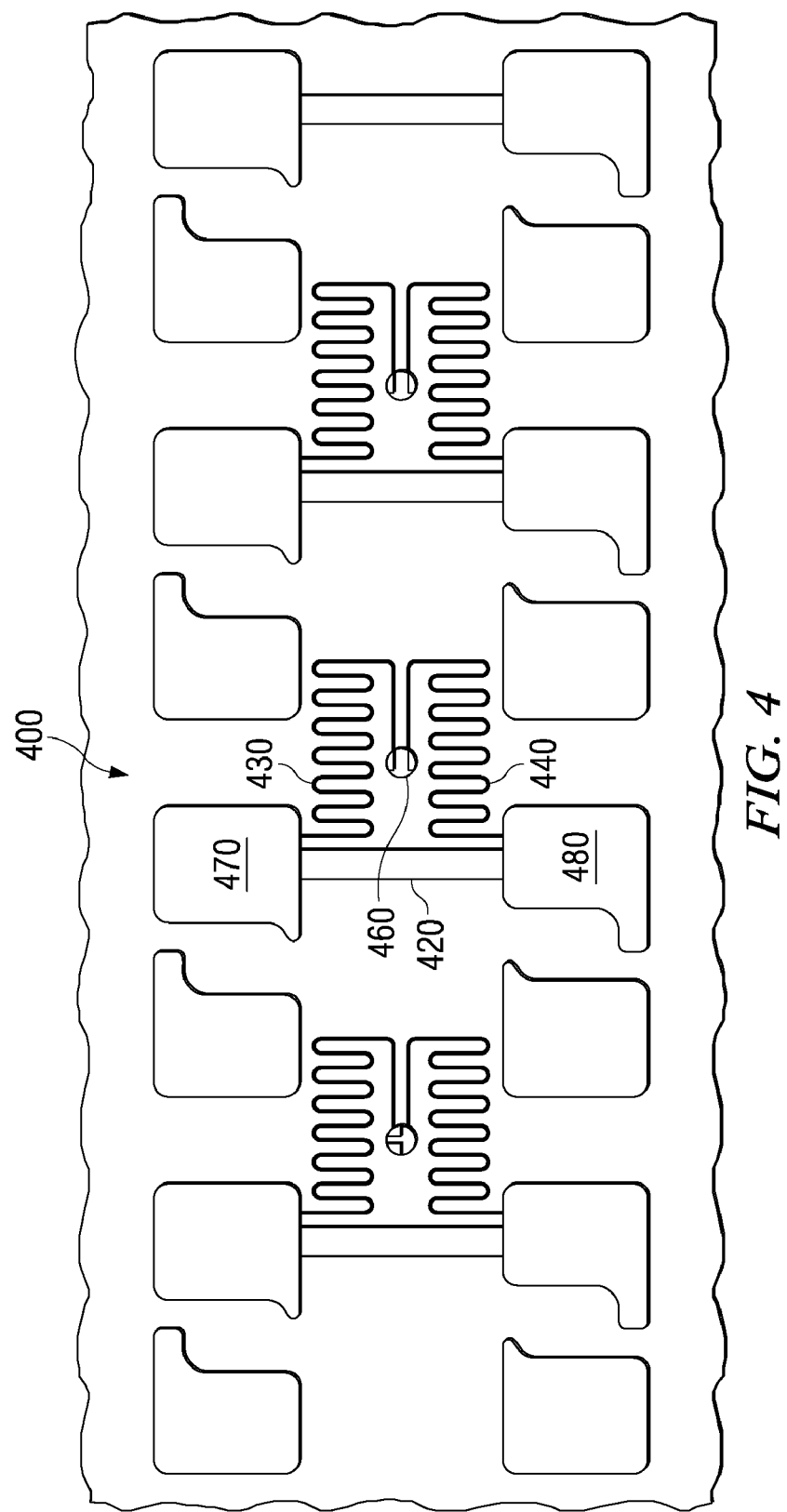
FIG. 4 depicts a wafer surface region according to an embodiment of the present invention.

The parallel and shunt resistors can take various forms in various embodiments of the present invention. For example, FIG. 4 depicts a wafer surface region that includes a plurality of read transducers according to an embodiment of the present invention. Focusing now on the read transducer 400 depicted in the middle of FIG. 4, parallel resistor 420 is electrically connected to bond pad 470, which is electrically connected to a top lead (not shown). Parallel resistor 420 is also electrically connected to bond pad 480, which is electrically connected to a bottom lead (not shown). In the embodiment of FIG. 4, parallel resistor 420 is defined to be rectangular with a parallel resistor path width and a parallel resistor path length. In certain embodiments, the parallel resistor path width and the parallel resistor path length are preferably chosen so that the parallel resistor has a resistance in the range 0.1 to 5 kΩ. In certain embodiments, the parallel resistor path width is preferably chosen to be in the range 0.2 to 5 microns. In certain embodiments, the parallel resistor path length is chosen to be in the range 5 to 1250 microns. In certain embodiments, the parallel resistor 420 may provide additional protection against ESD damage to the TMR sensor, and/or may make the dynamic range of the TMR sensor more controllable.

In the embodiment of FIG. 4, shunt resistor 430 is electrically connected to bond pad 470 and to the substrate through via 460, and shunt resistor 440 is electrically connected to bond pad 480 and to the substrate through via 460. In certain embodiments, the resistance of shunt resistor 430 is preferably within ±10% of the resistance of shunt resistor 440. In the embodiment of FIG. 4, shunt resistors 430 and 440 are each defined to have a serpentine shape, and to each have a shunt resistor path width and a shunt resistor path length. In certain embodiments, the shunt resistor path width and the shunt resistor path length are chosen so that each of the shunt resistors 430 and 440 preferably has a resistance greater than 1 kΩ. In certain embodiments, the shunt resistor path width is preferably chosen to be in the range 0.2 to 5 microns. In certain embodiments, the shunt resistor path length is preferably chosen to be in the range 50 microns to 50 mm.

Figure 5:
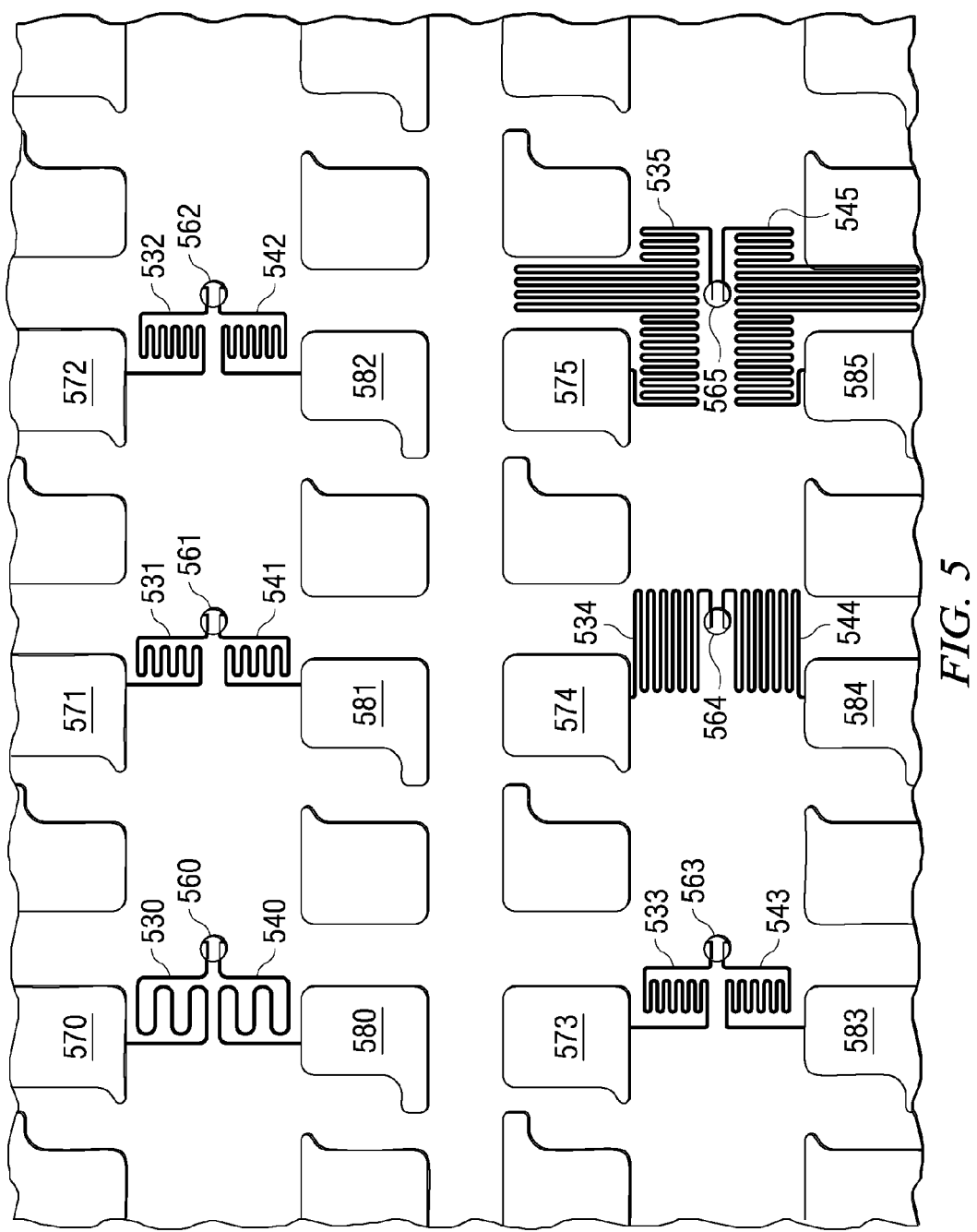
FIG. 5 depicts a wafer surface region including six other embodiments of the present invention.

FIG. 5 depicts a wafer surface region including six other embodiments of the present invention, except that parallel resistors are not shown for additional clarity in depicting the shunt resistor geometries. Shunt resistors 530, 531, 532, 533, 534, and 535 are electrically connected to bond pads 570, 571, 572, 573, 574, and 575, respectively, and to the substrate through vias 560, 561, 562, 563, 564, and 565, respectively. Shunt resistors 540, 541, 542, 543, 544, and 545 are electrically connected to bond pads 580, 581, 582, 583, 584, and 585, respectively, and to the substrate through vias 560, 561, 562, 563, 564, and 565, respectively. Shunt resistors 530, 531, 532, 533, 534, and 535 each has a serpentine shape with a different shunt resistor path length to achieve a different desired resistance. Also, shunt resistors 540, 541, 542, 543, 544, and 545 each has a serpentine shape with a different shunt resistor path length to achieve a different resulting resistance. In certain embodiments, the shunt resistor path length is chosen, in consideration of the resistivity of the laminated TMR layer, and in consideration of a chosen practical shunt resistor path width, so that the resulting resistance is greater than 1 kΩ. In certain embodiments, the practical shunt resistor path width is preferably chosen to be in the range 0.2 to 5 microns.

Figure 6:
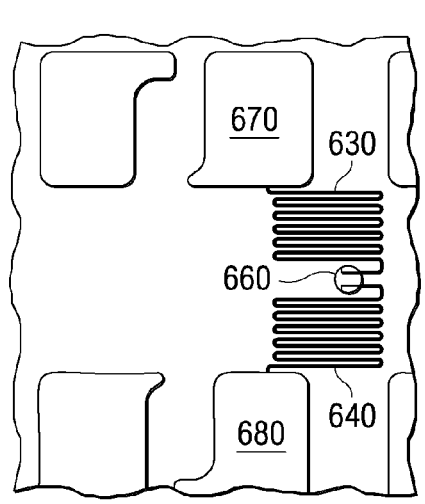
FIG. 6 depicts a wafer surface region according to another embodiment of the present invention.

FIG. 6 depicts a wafer surface region according to another embodiment of the present invention, except that the parallel resistor is not shown for additional clarity in depicting the shunt resistor geometry. Shunt resistor 630 is electrically connected to bond pad 670 and to the substrate through via 660. Shunt resistor 640 is electrically connected to bond pad 680 and to the substrate through via 660. Shunt resistors 630 and 640 each have a serpentine shape, and in certain embodiments the resistance of shunt resistor 630 is preferably within ±10% of the resistance of shunt resistor 640.

Figure 7:
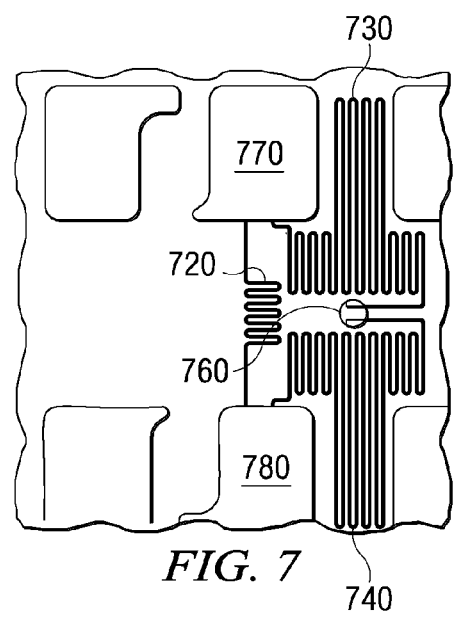
FIG. 7 depicts a wafer surface region according to another embodiment of the present invention.

FIG. 7 depicts a wafer surface region according to another embodiment of the present invention. Parallel resistor 720 has a serpentine shape and is connected to bond pad 770, which is electrically connected to a top lead (not shown). Parallel resistor 720 is also electrically connected to bond pad 780, which is electrically connected to a bottom lead (not shown). Shunt resistor 730 also has a serpentine shape and is electrically connected to bond pad 770 and to the substrate through via 760. Shunt resistor 740 also has a serpentine shape and is electrically connected to bond pad 780 and to the substrate through via 760.

In the foregoing specification, the invention is described with reference to specific exemplary embodiments thereof, but those skilled in the art will recognize that the invention is not limited thereto. It is contemplated that various features and aspects of the above-described invention may be used individually or jointly and possibly in an environment or application beyond those described herein. The specification and drawings are, accordingly, to be regarded as illustrative and exemplary rather than restrictive. The terms "comprising," "including," and "having," as used herein are intended to be read as open-ended terms.

We claim:

1. A method to fabricate a tunneling magnetoresistive (TMR) read transducer, comprising the acts of:
    depositing an insulative layer on a wafer substrate;
    depositing a bottom lead over the insulative layer;
    depositing a laminated TMR layer over the bottom lead, the laminated TMR layer comprising a plurality of laminates;
    defining a TMR sensor having a stripe height in the TMR layer;
    defining a parallel resistor in the TMR layer;
    defining first and second shunt resistors in the TMR layer;
    depositing a top lead over the TMR sensor;
    electrically connecting the parallel resistor to the bottom lead and to the top lead;
    electrically connecting the first shunt resistor to the bottom lead and the wafer substrate;
    electrically connecting the second shunt resistor to the top lead and the wafer substrate.

2. The method of claim 1 wherein the acts of defining the sensor stripe height, defining the parallel resistor, and defining the first and second shunt resistors each include etching the TMR layer.

3. The method of claim 2 wherein the act of defining the sensor stripe height is accomplished using a vacuum manufacturing apparatus and by an etching technique, and wherein the acts of defining the parallel resistor and defining the first and second shunt resistors are accomplished using the same vacuum manufacturing apparatus and by the same etching technique.

4. The method of claim 2 wherein the steps of defining the sensor stripe height, defining the parallel resistor, and defining the first and second shunt resistors are performed simultaneously in a single process step.

5. The method of claim 1 wherein a resistance of the first shunt resistor is within ±10% of a resistance of the second shunt resistor.

6. The method of claim 1 wherein each of the first and second shunt resistors is defined to have a shunt resistor path width and a shunt resistor path length, and wherein the shunt resistor path width and the shunt resistor path length are chosen so that each of the first and second shunt resistors has a resistance greater than 1 k$\Omega$.

7. The method of claim 6 wherein the each of first and second shunt resistors is defined to have a serpentine shape.

8. The method of claim 6 wherein the shunt resistor path width is chosen to be in the range 0.2 to 5 microns.

9. The method of claim 6 wherein the shunt resistor path length is chosen to be in the range 50 microns to 50 mm.

10. The method of claim 1 wherein the parallel resistor is defined to have a parallel resistor path width and a parallel resistor path length, and wherein the parallel resistor path width and the parallel resistor path length are chosen so that the parallel resistor has a resistance in the range 0.1 to 5 k$\Omega$.

11. The method of claim 10 wherein the parallel resistor path width is chosen to be in the range 0.2 to 5 microns.

12. The method of claim 10 wherein the parallel resistor path length is chosen to be in the range 5 to 1250 microns.

13. The method of claim 1 wherein the plurality of laminates includes a barrier laminate that comprises an oxide of aluminum, titanium, or magnesium, the oxide being electrically insulative in bulk.

14. The method of claim 1 wherein the plurality of laminates includes a barrier laminate that comprises a nitride of aluminum, silicon, or niobium, the nitride being electrically insulative in bulk.

15. The method of claim 1 wherein the laminated TMR layer has a resistance area product no greater than 10 $\Omega*0\mu m^2$.

* * * * *